March 14, 1967
G. M. LA POINTE
3,308,690
TORQUE LIMITING DEVICE
Filed May 14, 1965
2 Sheets-Sheet 1
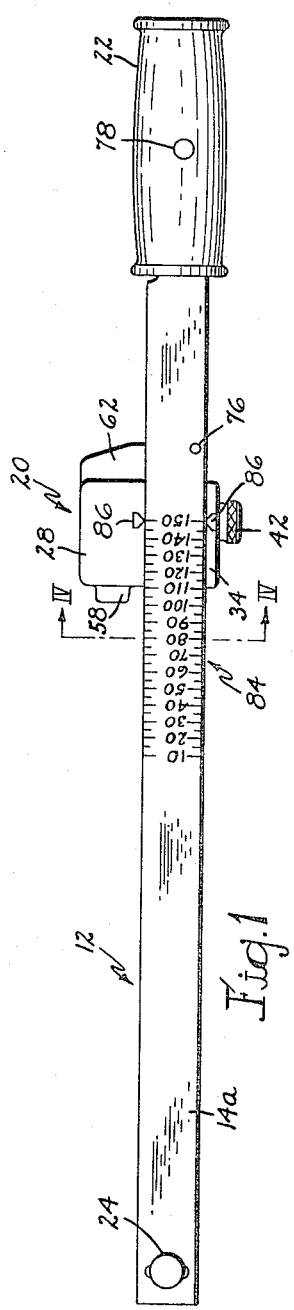
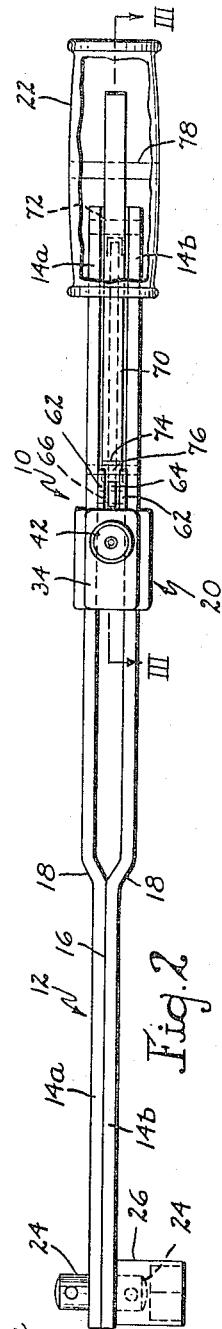
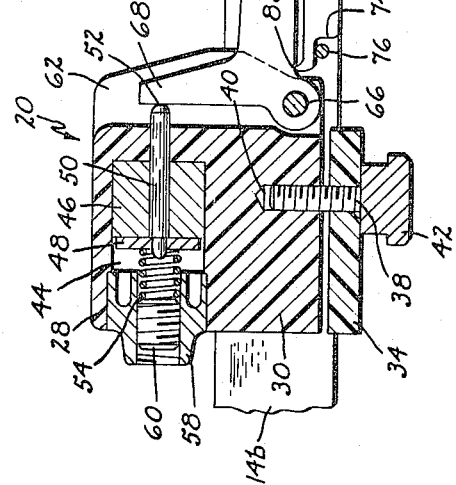
INVENTOR.
Gabriel M. La Pointe
BY
Alwin S. Blodgett
Attorney March 14, 1967 G. M. LA POINTE 3,308,690
TORQUE LIMITING DEVICE
Filed May 14, 1965 2 Sheets-Sheet 2
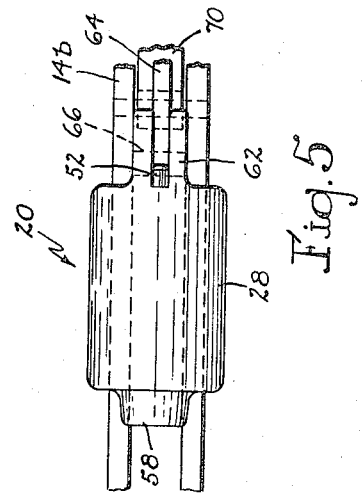
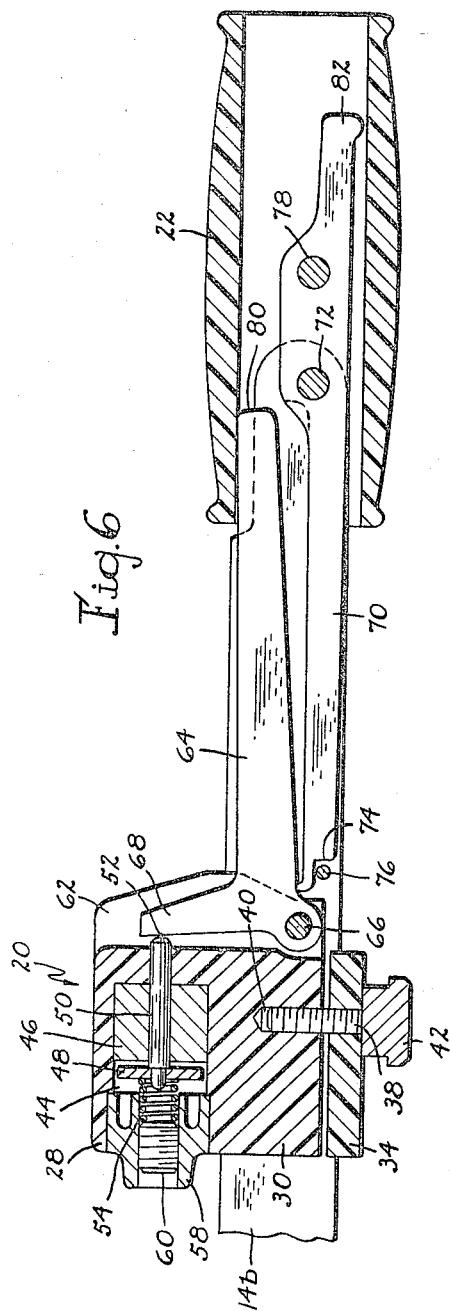
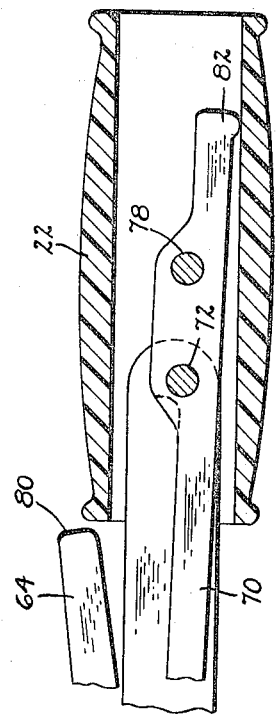
INVENTOR.
Gabriel M. La Pointe
BY
Attorney

United States Patent Office 3,308,690
Patented Mar. 14, 1967

3,308,690
TORQUE LIMITING DEVICE
Gabriel M. La Pointe, Worcester, Mass., assignor to Parker Mfg. Company, Worcester, Mass., a corporation of Massachusetts
Filed May 14, 1965, Ser. No. 455,836
7 Claims. (Cl. 81—52.5)

This invention relates generally to devices for controlling the magnitude of torque applied to a workpiece and, more particularly, to an improved means for presetting the exact point at which the desired torque level is achieved.

The problem of precisely applying a preselected magnitude of torque to a workpiece is one that has yet to be solved to the complete satisfaction of those skilled in the art. More particularly, although a wide variety of torque measuring and limiting devices have heretofore been developed, their proper application has been continually hampered by a failure on the part of those making use of the devices ot realize exactly when the desired torque magnitude has been reached. This is particularly true where the devices are being used in work areas having relatively high noise levels. Under these conditions, the user is often distracted by his surroundings with the result that the desired torque level is either exceeded or never reached at all. In other words, although many of the prior art devices are capable of accurate torque measurement, experience now indicates that human error often detracts from the desired end results.

The present invention has succeeded in solving this problem by providing means for producing a positive signal when the desired torque level is attained. In addition to being clearly audible, the signal produced by the present invention is also preceptible to the sense of touch and, therefore, capable of being felt by the user of the device. This dual warning capacity effectively eliminates the possibility of a user inadvertently exceeding the preselected torque limit and thus enables one to take full advantage of the inherent accuracy provided by the basic torque measuring device. As will, hereinafter, become more apparent, this dual signalling capacity is particularly useful when applying a relatively low torque.

It is, therefore, an outstanding object of this invention to provide an improved means for positively signalling the user of a torque limiting device when a predetermined torque magnitude has been applied to a workpiece.

Another object of the invention is the provision of a torque limit signal which is perceptible to the sense of touch.

A still further object of the invention is the provision of an improved warning device which produces a clearly perceptible signal upon attainment of a predetermined torque magnitude.

Another object of the present invention is the provision of means for eliminating the uncertainty frequently accompanying use of conventional torque limiting devices.

A further object of the present invention is the provision of an improved torque limiting device embodying positive perceptible signalling means, said device being simple in constructon, reliable in operation, and inexpensive to manufacture.

Another object of the present invention is the provision of a torque limit signal which is adjustable over a wide range of torque magnitudes.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which:

FIG. 1 is a plan view of a torque limiting wrench embodying the concepts of the present invention, FIG. 2 is a side view of the device shown in FIG. 1 with a portion of the handle broken away, FIG. 3 is an enlarged sectional view taken along line III—III of FIG. 2, FIG. 4 is an enlarged sectional view taken along the line IV—IV of FIG. 1, FIG. 5 is an enlarged side view of the torque limiting assembly, FIG. 6 is a view similar to FIG. 3 after a predetermined relatively high torque level has been reached, and FIG. 7 is a partial view of the same components shown in FIG. 6 after a predetermined relatively low torque has been reached.

In general, this invention involves a torque wrench in which the limitation of torque is provided by means of a magnet and armature and the release of the armature by the magnet results in a rapping inside of the handle of the wrench which can be heard as well as felt.

The invention will, hereinafter, be described in connection with a torque wrench of the type utilizing interchangeable socket heads. It is to be understood, however, that the association of the invention with this particular type of wrench is intended only as an illustration and should not in any way be considered as a limitation upon the scope of the claims appended hereto.

Referring initially to FIGS. 1 and 2, wherein are best shown general features of the invention, a torque limiting wrench, generally indicated by the reference numeral 10, is shown comprised basically of an elongated lever 12 made up of two matching frame members 14a and 14b joined for a distance as at 16. The frame members flare outwardly as at 18 and, thereafter, continue in parallel spaced relationship towards the other end of the tool. A torque limiting assembly, generally indicated by the reference numeral 20 (a more complete description of which will, hereinafter, be presented) is slidably mounted on lever 12 and connected through an intermediate linkage system to a handle 22. At the end opposite from handle 22, the lever 12 is provided with a conventional tool adapter 24, herein shown for illustrative purposes as being of the type designed to receive a socket head 26 in axial insertion thereon.

As can be best seen in FIGS. 3, 4, and 5, torque limiting assembly 20 is comprised basically of a housing 28 formed of plastic with a cylindrically-shaped upper portion having an integrally fabricated base 30 depending therefrom. The sides of base 30 are notched as at 32 (see FIG. 4) to accept frame members 14a and 14b when housing 28 is mounted on lever 12, as shown in the drawings. An underlying locking plate 34 also notched as at 36 is connected to housing 28 by means of a screw 38 threaded into a tapped hole 40 in base 30. Screw 38 is provided with an enlarged knurled head 42 which is readily accessible to the user of the tool. When screw 38 is loosened, locking plate 34 drops slightly from its wedged position between frame members 14a and 14b and this, in turn, permits housing 28 to be displaced in either direction along the length of lever 12. When the desired adjustment is attained, screw 38 is again tightened, thereby pulling housing 28 and locking plate 34 together in a clamped position on frame members 14a and 14b.

The upper cylindrical portion of housing 28 is provided with a chamber 44 into which is fixed a permanent magnet 46. A magnetically permeable armature disk 48 is also contained for reciprocal movement within chamber 44. Armature 48 is further provided with an outwardly extending actuating pin 50 which slidably protrudes through magnet 46 and the rear wall of housing 28 to terminate in an exposed end 52. Unless an external separating force is applied to actuating pin 50, armature 48 will remain in contact with magnet 46, as shown in FIG. 3, due to the normal existing forces resulting from magnetic attraction.

In the preferred embodiment shown in the drawings, armature 48 is yieldingly urged against magnet 46 by a small coiled spring 54, one end of which is seated within a threaded hole extending through plastic end plug 58. An adjusting screw 60 is threaded into end plug 58 and bears against the rear of spring 54. This arrangement provides a means for varying the spring force being applied to armature 48 and thus enables one to adjust the force necessary to separate armature 48 from magnet 46.

The intermediate linkage arrangement connecting torque limiting assembly 20 to handle 22 will now be described with further reference to FIGS. 3 to 7. Housing 28 is provided with two spaced integrally fabricated extensions 62 which extend to the rear on either side of the exposed end 52 of actuating pin 50. A first lever 64 is pivotally mounted between extensions 62 by means of a short pin 66 extending therebetween at a point below the exposed actuating pin end 52. Lever 64 is provided with an integral upstanding finger 68 arranged to contact actuating pin end 52 when the lever is pivoted in a counter-clockwise direction about pin 66.

A second thicker lever 70 is pivotally mounted between frame members 14a and 14b by means of a pivot pin 72 extending therebetween at the handle end of the tool. Both levers 64 and 70 are arranged in vertical alignment, as can be partially seen in FIG. 2. The forward end of lever 70 is notched as at 74 to permit seating on a retaining pin 76 extending transversely between frame members 14a and 14b. Finally, handle 22 is pivotally attached to the rear portion of lever 70 by means of a pivot pin 78. With the torque limiting assembly adjusted as in FIG. 3, the rear ends 80 and 82 of links 64 and 70 are located within tubular handle 22.

Having thus described the principal components of the invention, its operation and the advantages derived therefrom will now be reviewed with addition reference to FIGS. 6 and 7. When making use of the device, the first step is to adjust the torque limiting assembly 20 to the desired torque level. This is accomplished by first turning knurled head 42 to loosen locking screw 38. This permits housing 28 to be moved along the length of lever 12. A graduated torque scale (here showing foot-pounds), generally indicated by the reference numeral 84, is marked off on the outer face of frame member 14a and by moving housing 28, the point indicators 86 can be brought into alignment with the desired torque level. Once this has been accomplished, screw 38 is again tightened to lock the housing in place.

With the torque limiting assembly properly adjusted and the proper sized socket head 26 axially inserted on a tool adapter 24, the device is ready for use. The socket is applied to a workpiece, as for example, a bolt head, and torque applied by exerting a clockwise force on handle 22. The force on handle 22 is transferred through pin 78 to lever 70, the latter having a tendency to pivot in a clockwise direction about pin 72. This, in turn, results in a force being applied through pin 72 to the frame members 14a and 14b of lever 12, and it is this force applied over the length of the lever which transmits torque to the workpiece. Since lever 70 has a tendency to pivot about pin 72, its forward end will contact the lower edge of lever 64 as at 88, exerting an upward force thereon tending to rotate lever 64 in a counterclockwise direction about pin 66. Because, in FIGS. 1 to 6, assembly 20 had previously been adjusted to the maximum torque level (150 foot-pounds), pivot pin 66 was automatically positioned at the closest possible point to the end of lever 70. By urging rotation of lever 64 in a counterclockwise direction, a force is applied through finger 68 to the exposed end 52 of actuating pin 50. This force on pin 50 acts as a separating force tending to push armature 48 away from magnet 46. As the force being applied to handle 22 increases thereby resulting in a greater torque being applied to the workpiece, so the separating force on actuating pin 50 also increases until such time as the force of magnetic attraction between magnet 46 and armature 48 plus the compressive force of spring 54 is finally overcome. When this occurs, armature 48 will suddenly separate from magnet 46, causing the connecting levers 64 and 70 to instantaneously shift to a position as shown in FIG 6. By properly designing all tool elements, the aforementioned separation of armature from magnet can be made to occur at the torque level indicated on scale 84. An exact measurement can be assured by making fine adjustments to screw 60 in order to modify the spring pressure being exerted on armature 48.

At the exact moment that armature 48 separates from magnet 46, a signal will be produced which will be both audible and perceptible to the sense of touch. To explain, the aforementioned shift of armature 48 will cause the rear end 80 of lever 64 to strike a sharp blow to the inner surface of hollow handle 22. This blow will produce an audible sound and in addition, its force wll be transmitted through handle 22 to the hand of the user. Thus, it can be seen that a dual capacity signal is, in fact, created at the exact point at which the desired torque level is achieved, thereby effectively obviating any possibility of human error caused by inattention or unfavorable environmental conditions, such as a high noise level.

If a lower torque level is to be applied to a workpiece, torque limiting assembly 20 is simply moved along lever 12 in a direction way from handle 22. This will result in the point of contact 88 between lever 70 and lever 64 being moved further away from the pivot pin 66, thus increasing the mechanical advantage afforded by the linkage system connecting torque limiting assembly 20 to handle 22. In this manner, a smaller force on handle 22 will be required to separate armature 48 from magnet 46, thereby resulting in less torque being transmitted through lever 12 to the workpiece. By the same token, movement of torque limiting assembly away from handle 22 will also expose the end 80 of lever 64. When this occurs, and a torque subsequently applied to a workpiece, the intermediate linkage assembly comprised of levers 64 and 70 will again shift as soon as armature 48 separates from magnet 46. At this point, however, the dual signal will be created by the end 82 of lever 70 striking the inner surface of handle 22, as shown in FIG. 7.

It should, therefore, be apparent to one skilled in the art that, as a predetermined torque level is reached with the present device, the user will be warned by a signal which is both audible and perceptible to the sense of touch. This signal will be created by either lever end 82 or 80 striking the inner surface of handle 22, depending on the setting of torque limiting device 20.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. For use with a torque limiting wrench assembly of the type which includes an elongated frame having a torque applying member at one end and a handle at the other end, a torque limiting device comprising the combination of: a housing carried by said frame, a magnet fixed within said housing, a magnetically permeable armature reciprocally mounted within said housing for movement from a first position in contact with said magnet to a second disengaged position removed from said magnet, an actuating pin on said armature slidably extending through said magnet and housing to terminate in an exposed end outside said housing, and lever means connecting said handle to the exposed end of said actuating pin, said lever means operable to transfer a signal perceptible to the sense of touch from said actuating pin to said handle upon movement of said armature from said first position to said second position.

2. The apparatus as set forth in claim 1, wherein said lever means is comprised of a first lever pivotally mounted on said housing and in contact with the exposed end of said actuating pin, a second lever pivotally mounted on said frame, one end of said second lever bearing against said first lever, said handle pivotally mounted on said second lever adjacent the other end thereof, whereby force applied to said handle will result in said first lever being pressed against said actuating pin.

3. The apparatus as set forth in claim 2 further characterized by said housing being adjustable on said frame in order to vary the point at which said second lever bears against said first lever, whereby adjustment of said housing will result in a corresponding adjustment of the force applied to said actuating pin.

4. A torque limiting wrench comprising
 (a) an elongated frame with a torque applying member positioned at one end thereof,
 (b) a handle adjacent the other end of said frame,
 (c) a torque limiting device connecting said handle to said frame,
 (d) said torque limiting device comprised of a housing slidably mounted on said frame for movement along the length thereof,
 (e) a magnet fixed within said housing,
 (f) a magnetically permeable armature positioned within said housing adjacent said magnet with an actuating pin extending therefrom through said magnet and housing to terminate in an exposed end outside said housing, said armature adapted for reciprocal movement from a first position in contact with said magnet to a second position in contact with said housing under the influence of a sufficient separating force applied to the exposed end of said actuating pin,
 (g) spring means yieldingly urging said armature against said magnet,
 (h) means for varying the force exerted on said armature by said spring means in order to adjust the force required to separate said armature from said magnet,
 (i) a first lever pivotally mounted on said housing, one end of said first lever adjacent the exposed end of said actuating pin,
 (j) a second lever pivotally mounted on said frame, one end of said second lever bearing against said first lever, thereby urging the said one end of said first lever into contact with the exposed end of said actuating pin, said handle pivotally carried by said second lever at a point adjacent the pivotal connection of said second lever to said frame, whereby a torque producing force applied to said handle will result in a separating force being applied through said first and second levers to the exposed end of said actuating pin, the other ends of said levers located in relation to said handle so as to cause a blow perceptible to the sense of touch to be struck said handle upon movement of said armature from said first position to said second position.

5. The apparatus as set forth in claim 4 further characterized by an audible sound being produced by movement of said armature from said first position in contact with said magnet to said second position in contact with said housing.

6. A torque transmitting and limiting tool assembly, comprising
 (a) an elongated lever provided at one end with a work engaging member,
 (b) a torque applying handle adjacent the other end of said lever,
 (c) torque limiting means connecting said handle to said lever, said torque limiting means being capable of imparting a perceptible signal to said handle when a predetermined torque has been applied to a workpiece held by said work engaging member, the torque limiting device comprising a housing containing a fixed magnet, a magnetically permeable armature reciprocally mounted within said housing for movement from a first position in contact with said magnet to a second disengaged position remote from said magnet, and means for connecting said armature to said handle whereby the production of said signal will be controlled by movement of said armature from said first position to said second position.

7. An assembly as recited in claim 6, wherein adjustable means is provided for yieldingly urging said armature against said magnet.

References Cited by the Examiner

UNITED STATES PATENTS

| | | | |
|---|---|---|---|
| 2,300,652 | 11/1942 | Cooney | 81—52.5 |
| 2,791,141 | 5/1957 | Johnson et al. | 73—139 X |
| 2,812,677 | 11/1957 | Paterson | 73—139 X |
| 3,018,677 | 1/1962 | Mutolo et al. | 81—52.5 X |
| 3,132,548 | 5/1964 | Livermont | 81—52.5 X |

WILLIAM FELDMAN, *Primary Examiner.*

JAMES L. JONES, JR., *Examiner.*